Figure 1:
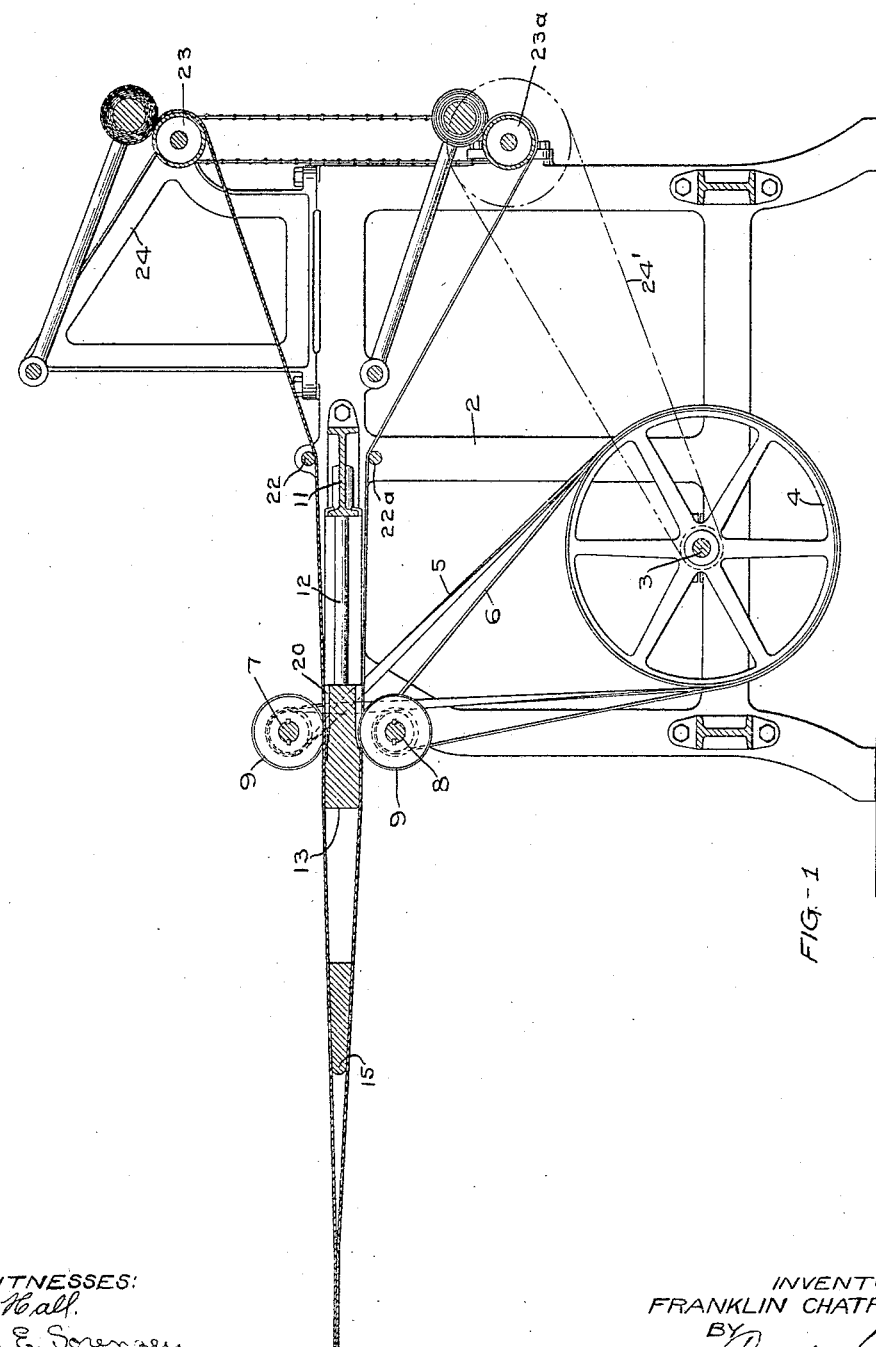

F. CHATFIELD.
FABRIC STRETCHER.
APPLICATION FILED JAN. 21, 1918.

1,298,006.

Patented Mar. 25, 1919.
3 SHEETS—SHEET 1.

WITNESSES:
B. Hall.
G. E. Sorensen

INVENTOR:
FRANKLIN CHATFIELD.
BY
Paul & Paul
ATTORNEYS.

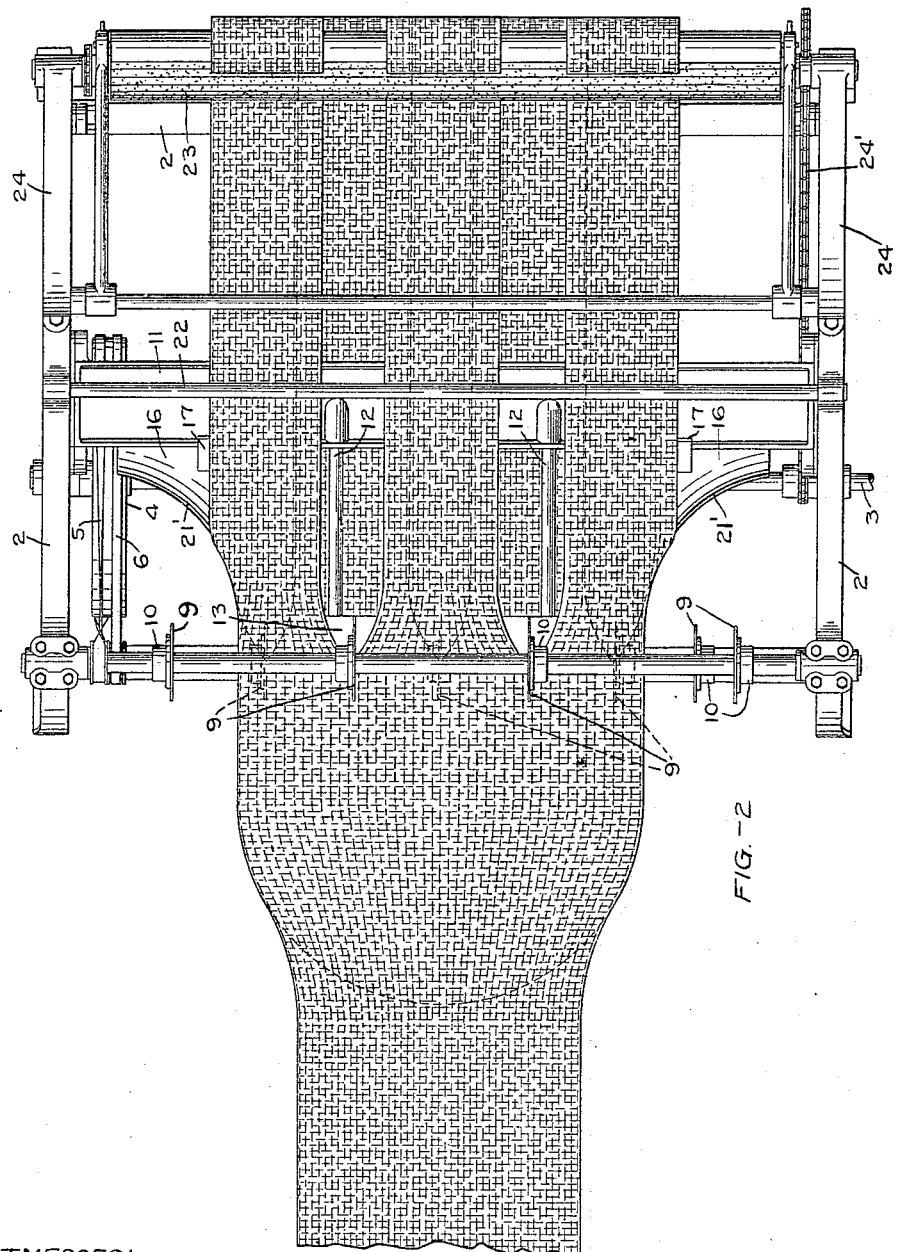

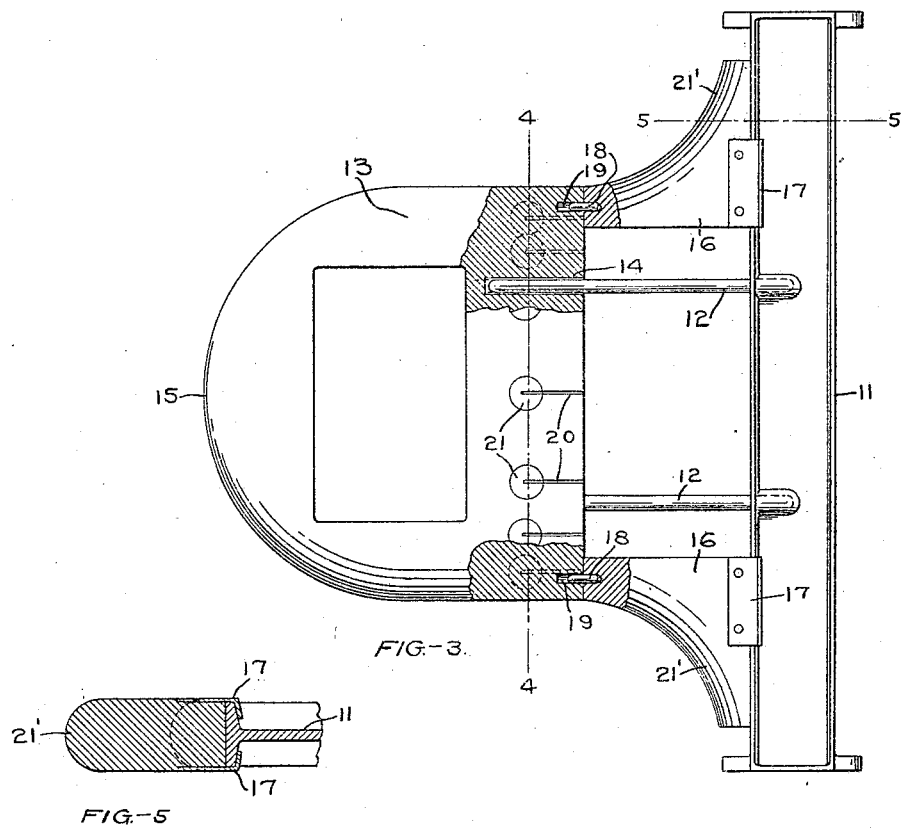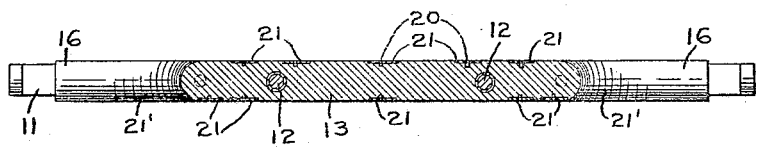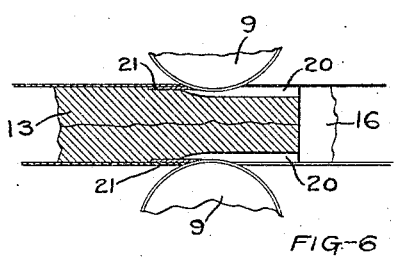

UNITED STATES PATENT OFFICE.

FRANKLIN CHATFIELD, OF MINNEAPOLIS, MINNESOTA.

FABRIC-STRETCHER.

1,298,006. Specification of Letters Patent. Patented Mar. 25, 1919.

Original application filed January 18, 1916, Serial No. 72,733. Divided and this application filed January 21, 1918. Serial No. 213,025.

*To all whom it may concern:*

Be it known that I, FRANKLIN CHATFIELD, a citizen of the United States, resident of Minneapolis, county of Hennepin, State of Minnesota, have invented certain new and useful Improvements in Fabric-Stretchers, of which the following is a specification.

The object of my invention is to provide a stretcher by means of which a fabric tube may be spread or stretched preparatory to slitting the same into longitudinal strips.

A further object is to provide a stretcher which can be easily mounted on a machine and as readily removed.

The invention consists generally in various constructions and combinations, all as hereinafter described and particularly pointed out in the claims.

In the accompanying drawings forming part of this specification,

Figure 1 is a vertical sectional view through a fabric tube slitting machine with my improved spreader applied thereto, Fig. 2 is a plan view of the same, Fig. 3 is a plan view, partially in section, showing the spreader mounted on the machine and the position of the slitting knives therein, Fig. 4 is a sectional view on the line 4—4 of Fig. 3, Fig. 5 is a sectional view on the line 5—5 of Fig. 3, Fig. 6 is a detail sectional view, showing the grooves in the surface of the spreader to receive the slitting knives.

In the drawing, 2 represents the frame of the machine in which the slitting mechanism is mounted. 3 is a drive shaft, operated from a suitable source of power, not shown. 4 is a wide faced pulley mounted on this shaft and provided with narrow belts 5 and 6 for operating shafts 7 and 8 mounted one above another in the frame 2. The upper belt 5 is twisted to operate the upper shaft in the opposite direction from the lower one. Upon these shafts a series of circular knives 9 are mounted, upon suitable hubs 10 which are adjustable back and forth on the shaft toward and from one another to increase or decrease the distance between the knives and vary the width of the knit bands which are slit out of the tubular fabric. A bar 11 is mounted tranversely of the frame of the machine and is provided with forwardly projecting rods 12 arranged in parallel relation. 13 is a stretcher having sockets 14 to receive the rods 12. This stretcher is made of suitable material, preferably wood, and has an outer end 15 which is curved horizontally and vertically. The upper and under surfaces are substantially parallel with one another and merge into the rounded outer end to present a smooth surface for the passage of the fabric tube thereover. The curvature of the end of the stretcher is such that the fabric is spread sufficiently to lie smoothly and evenly on the upper and under surfaces of the stretcher. The device is readily removable from the rods 12 for the purpose of substituting a stretcher of different width or shape to adapt it for tubes of varying sizes.

In the rear of the stretcher I prefer to provide brackets 16 having plates 17 mounted thereon which are slidable back and forth on the bar 11 and dowel pins 18 are mounted in these brackets to enter sockets 19 in the stretcher and aid in holding it in its proper position with respect to the slitting saws. The saws are so mounted that the inner end of the stretcher will be inserted between them, as indicated in Fig. 1, and the upper and under surfaces of the stretcher are provided with slits 20 therein to receive the cutting edges of the saws, and plates 21 are mounted in the surface of the stretcher at the inner ends of the slits. These saw slits are arranged in staggered relation to one another, as indicated in Fig. 4, there being a group in the upper surface of the stretcher and a group in the under surface, slits being provided in the under surface near the outer edges of the stretcher. Each bracket 16 has a curved surface 21′ forming a flaring guide for the fabric band as it is slit from each side of the tube.

The slitting operation is performed as follows: The two upper slitting knives cut a band out of the center of the fabric as it passes over the top of the stretcher and coöperate with the two lower outer knives of the under side of the stretcher to cut the outer bands, that portion of the tube which passes around the curved edge of the stretcher being turned outwardly and laid flat by contact with the curved edges of the bracket 16, so that when the outer edges of the bands have passed over these brackets they will lie perfectly flat and the bands will be substantially the width of the band in the middle, as indicated in Fig. 2. The middle lower knife enters the slit in the center of the stretcher on the underside and divides the tube centrally, coöperating with the corresponding knife on the top of the stretcher.

As indicated in Fig. 3, the groups of saw slits in the top and bottom thereof are differently spaced apart, so that the stretcher can be used with varying adjustments of the cutters for slitting bands of different width. The distance between these saw slits may be marked or indicated on the stretcher so that the operator of the machine in moving the cutters back and forth on the supporting shafts to adapt them for varying widths of the bands can easily and quickly determine the proper position of the cutters for slitting the tube to form bands of the desired width.

The upper bands, after leaving the slitting knives, pass under a rod 22 and thence to a roller 23 mounted in brackets 24. A similar roller 23ᵃ receives the lower band of the fabric which passes over a rod 22ᵃ. The rollers are driven through a belt 24'.

I claim as my invention:

1. A fabric stretcher comprising a block having substantially flat upper and under surfaces, the end of said block to enter the fabric having a surface that is curved horizontally and vertically and merging into said upper and under surfaces, in combination with a fabric winding machine whereon said stretcher is mounted.

2. A fabric stretcher comprising a block, flattened in form, having an obtuse rounded end for entering the fabric to be stretched, in combination with a fabric winding machine whereon said stretcher is mounted.

3. A fabric stretcher comprising a block flattened in form, the side edges of said block being rounded and the end for entering the fabric being obtuse and curved to merge into the curvature of said edges, in combination with a fabric winding machine whereon said stretcher is mounted.

4. A fabric stretcher comprising a block and supports whereon said block is removably mounted, the end of said block for entering the fabric being obtuse and having a surface that is rounded in longitudinal and transverse section, in combination with a fabric winding apparatus whereon said stretcher is supported 5. A fabric stretcher having sockets therein and rods to enter said sockets and whereon said stretcher is removably mounted, in combination with a fabric winding machine whereon said rods are mounted.

6. A fabric stretcher comprising a block having upper and under surfaces and a curved edge for bearing on the walls of the fabric and stretching the same, the fabric resting snugly on the upper and under surfaces of said stretcher and the rear portion of said stretcher having parallel slits therein to receive the fabric slitting saws.

7. A fabric stretcher adapted to enter a fabric tube and having an end curved in horizontal and vertical section, and side portions curved in vertical section, in combination with a fabric winding machine whereon said stretcher is mounted.

8. A fabric stretcher comprising a member having an end to enter a fabric tube, and edges for engaging and stretching the walls of the tube, said stretcher gradually decreasing in width from its rear toward its forward end, in combination with a fabric winding apparatus whereon said stretcher is supported.

9. In a fabric slitting machine, a fabric stretcher horizontally mounted on the receiving end of said machine having flattened upper and under surfaces and an outer end that is curved in horizontal section.

10. In a fabric slitting machine, a fabric stretcher comprising a horizontally mounted, removable member having a curved end to enter and stretch the fabric tube, the rear portion of said member having slits therein to receive the fabric slitting saws.

In witness whereof, I have hereunto set my hand this 10th day of January, 1918.

FRANKLIN CHATFIELD.

Copies of this patent may be obtained for five cents each, by addressing the "Commissioner of Patents, Washington, D. C."